United States Patent
Orr

[11] 3,877,545
[45] Apr. 15, 1975

[54] LUBRICATION SYSTEM FOR VEHICLE FINAL DRIVE

[75] Inventor: Robert S. Orr, Pekin, Ill.

[73] Assignee: Caterpillar Tractor Company, Peoria, Ill.

[22] Filed: Jan. 26, 1973

[21] Appl. No.: 327,093

[52] U.S. Cl. ............... 184/6.3; 60/456; 184/6.25; 210/222; 417/315
[51] Int. Cl. .................................. F01m 9/00
[58] Field of Search ............. 60/456, 477, DIG. 3; 210/222; 184/6, 6 R, 6.25, 6.28, 6.3; 417/315

[56] References Cited
UNITED STATES PATENTS

| 467,645 | 1/1892 | Richards | 210/222 |
|---|---|---|---|
| 2,277,270 | 3/1942 | Schmitter | 417/315 |
| 2,326,167 | 8/1943 | Piquerez | 184/6.3 |
| 2,508,666 | 5/1950 | Frantz | 210/222 |
| 2,511,637 | 6/1950 | Johannes | 210/222 |
| 2,596,743 | 5/1952 | Vermeiren | 210/222 |
| 2,612,268 | 9/1952 | Merwin | 210/222 |
| 2,771,995 | 11/1956 | Noel | 210/222 |
| 3,040,896 | 6/1962 | Stem | 210/222 |
| 3,604,205 | 9/1971 | Geselbracht | 60/472 |
| 3,658,153 | 4/1972 | Berman | 184/6.3 |
| 3,680,705 | 8/1972 | Happ | 210/222 |

Primary Examiner—Manuel A. Antonakas
Assistant Examiner—Daniel J. O'Connor
Attorney, Agent, or Firm—Phillips, Moore, Weissenberger, Lempio & Strabala

[57] ABSTRACT

A lubrication system includes a pump, a lubricant supply, and a reservoir through which lubricant is drawn from the supply to the pump, the pump directing the lubricant to appropriate places. The reservoir includes a standpipe therewithin running to the supply to insure that, upon temporary reversal of the pump, a predetermined amount of lubricant remains in the reservoir to prime the pump when the pump is normally driven forward again.

8 Claims, 3 Drawing Figures

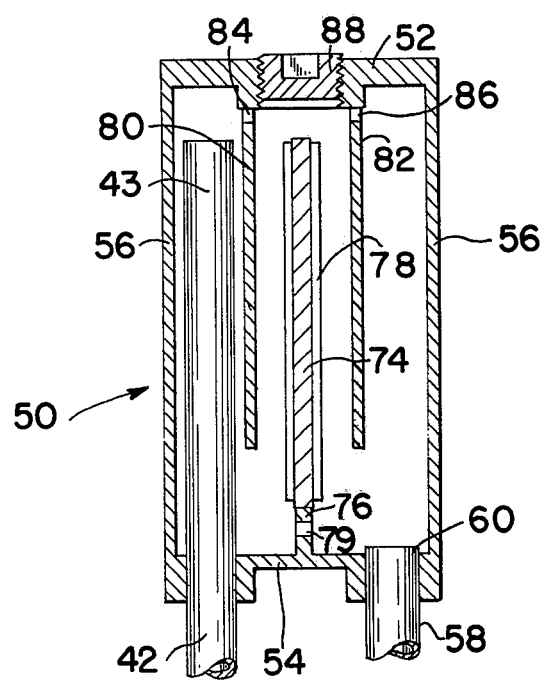

3,877,545

1

LUBRICATION SYSTEM FOR VEHICLE FINAL DRIVE

BACKGROUND OF THE INVENTION

This invention relates to a lubrication system for a vehicle final drive, and more particularly, to such a lubrication system including a reservoir for insuring that a pump is appropriately primed.

Vehicle final drives, such as employed on large crawler tractors, often incorporate a separate lubrication system including a driven pump for filtering the oil and lubricating the bearings and gearing incorporated therein. Because of the desired ground clearance and specific nature of the gearing disposed in the case of such final drive, it is often necessary to locate the pump considerably above the level of the lubricant contained in the case. This requires a relatively long intake line, and gives rise to cavitation problems and loss of prime of the pump. This problem is particularly onerous where unidirectional pumps are used, because they function in a single direction of travel (normally forward) and in the reverse mode of vehicle travel the pump acts to direct fluid and air back to the sump. Upon reversal of the vehicle again, the pump reverses, acting in a state of loss of prime that results in inefficient operation.

U.S. Pat. No. 3,618,712 to Casey (assigned to the assignee of this application) discloses a pump having check valves to retain lubricating fluid in the pump, to aid in keeping the pump primed. However, it is to be noted that dirt in the lower check valve could allow lubricating fluid to drain from the pump, resulting in the above-mentioned problem.

Of more general interest in this area is U.S. Pat. No. 3,604,205 to Geselbrecht et al (assigned to the assignee of this application).

SUMMARY OF THE INVENTION

It is an object of this invention to provide, in a lubricating system including a pump, means for insuring a proper prime of the pump, even if the pump is reversed temporarily.

It is a further object of this invention to provide, in a lubricating system including a pump, means which, while fulfilling the above object, are simple in design and effective in use.

Broadly stated, the invention comprises a lubrication system comprising a supply of lubricating liquid, and a first line having a first end in communication with the supply of lubricating liquid and extending upwardly therefrom to a second end. Further included are reservoir means comprising a reservoir body, the second end of the first line extending into the reservoir body for communication therewith. A second line has a first end extending into the reservoir body for communication therewith, the first end of the second line being at a lesser height than the second end of the first line, the second line having a second end extending outwardly of the reservoir body. A fluid pump is connected to the second end of the second line and is capable of pumping fluid through the second line to and from the reservoir body, whereby upon actuation of the pump to pump fluid from the reservoir body through the second line, lubricating liquid is drawn through the first line into the reservoir body, through the second line and through the pump, to an area to be lubricated, and whereby, upon actuation of the pump to pump fluid to the reservoir body through the second line, lubricating liquid is pumped through the second line into the reservoir body up to the level of the second end of the first line, and through the first line, and air may be pumped through the second line into the reservoir body, and through the first line, the greater height of the second end of the first line as compared to the first end of the second line insuring that, when fluid is pumped through the second line into the reservoir body, the level of lubricating liquid in the reservoir body remains substantially at the level of the second end of the first line.

BRIEF DESCRIPTION OF THE DRAWINGS

These and other objects of the invention will become apparent from a study of the following specification and drawings, in which:

FIG. 3 is an enlarged view, in section, of the reservoir means of the lubrication system.

DESCRIPTION OF THE PREFERRED EMBODIMENT

Figure 1:
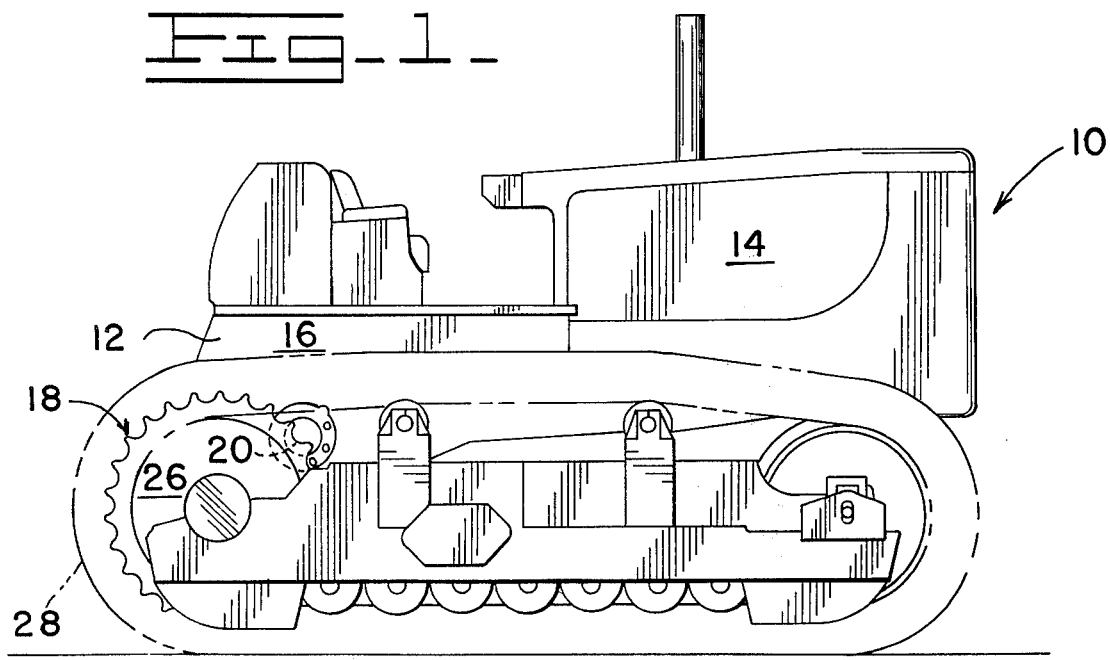
FIG. 1 is a side elevation of a tractor incorporating the inventive lubrication system.
Figure 2:
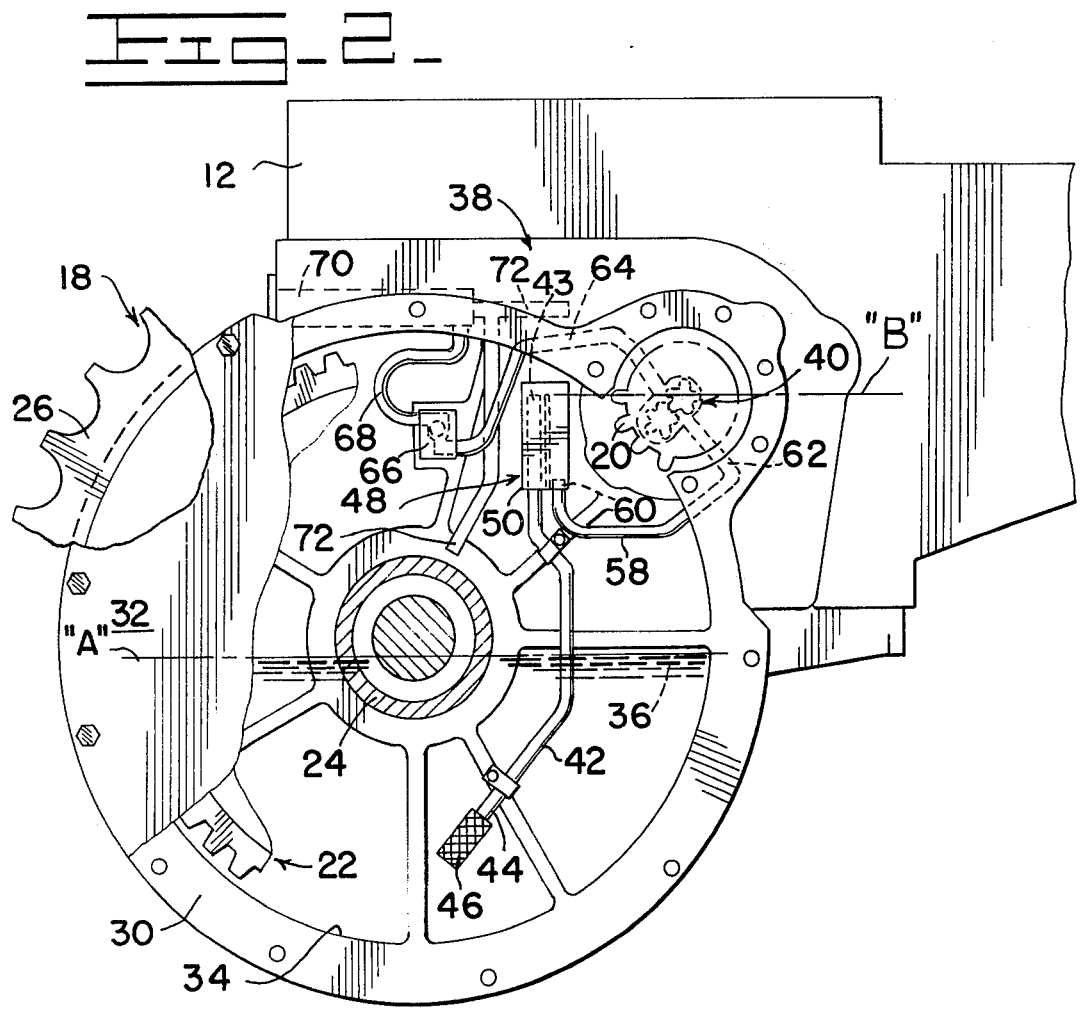
FIG. 2 is an enlarged view, partially broken away, of the lubrication system of FIG. 1.

A vehicle 10, such as a relatively large track-type tractor used for moving earth and the like, incorporates a vehicle frame 12, a forwardly disposed power plant 14, and a rearwardly associated transmission 16 disposed within the frame 12 in driving relation with a final drive assembly shown generally at 18. In the tractor environment shown, the final drive assembly 18 includes a driving input pinion 20, a conventional reduction gearing arrangement 22 driven thereby (only a portion of which is shown for illustrative clarity), an output shaft 24 driven by the reduction gear 22, and a sprocket 26 driven thereby which propels the vehicle 10 through contact with an endless track chain 28. The final drive assembly 18 further includes a final drive case 30 secured to the vehicle frame 12 and a removable outer cover 32 defining an enclosed chamber 34 which is normally filled with a lubricating liquid 36 up to a predetermined level such as shown by an elevational plane A.

A lubrication system shown generally by the reference numeral 38 is disposed substantially within the final drive case 30 and includes a unidirectionally effective but reversible fluid pump 40 driven in conjunction with the input pinion 20. A line 42 has a lower end 44 which extends to the lower end of the chamber 34 and includes a conventional intake screen 46. The line 42 extends upwardly from the chamber 34, and has an end 43 which enters into reservoir means 48 comprising a reservoir body 50. The reservoir body 50 includes a top portion 52, a bottom portion 54, and side portions 56. The line 42 actually extends through the bottom portion 54 of the body 50. A second line 58 also has an end 60 extending into the reservoir body 50 through the bottom portion 54. The other end 62 of the line 58 extends outwardly of the body 50. The reservoir body 50, it should be noted, is closed except for the end 43 of the line 42 extending therein, and the end 60 of the line 58 also extending therein. It is also to be noted that the end 60 of the line 58 is at a lesser height than the end 43 of line 42 as shown.

The fluid pump 40 is connected to the end 62 of the line 58. Extending from the pump 40 is a line 64 through which fluid is delivered to and through a ball check valve 66, a line 68, and a filter 70 to a plurality of branch conduits 72 to lubricate the various bearings and gears associated with the final drive assembly 18. The pump 40, as shown, is at an elevation B substantially the same as the elevation of the end 43 of line 42.

The body 50, as shown in FIG. 3, has a substantially flat magnetic member 74 removably fixed to a wall 76 extending upwardly from bottom portion 54, by means of a plurality of restraining ribs 78. The wall 76 defines a lower passage 79 adjacent the bottom portion 54, and the magnetic member 74 is disposed between the end 43 of line 42 and the end 60 of line 58, and extends to adjacent the top portion 52 of the reservoir body 50, along the end 43 of the line 42.

Baffles 80, 82 extend downwardly from the top portion 52 to adjacent bottom portion 54, baffle 80 being disposed between end 43 of line 42 and magnetic member 74 and baffle 82 being disposed on the other side of the magnetic member 74 and extending to adjacent bottom portion 54. These baffles 80, 82 define passages 84, 86 respectively adjacent the top portion of the body 50, above the level of the end 43 of line 42. A plug 88 is threadably connected to body 50 for filling the body 50 with lubricating liquid as desired and allowing access to the magnetic member 74 for removal thereof.

With forward movement of the vehicle 10 and accompanying rotation of the pump 40, liquid in chamber 34 is drawn through screen 46, line 42, and end 43 into the body 50, and out of the body 50 via line 58 through the pump 40 and to the area to be lubricated. It is to be understood that if the body 50 is initially empty of liquid, the pump 40 evacuates air from the body 50 until liquid begins to enter the body 50. While some lubricating liquid passes through passage 79, it is sized to limit the flow rate so that the left side of body 50 is substantially filled with liquid before appreciably filling the right side thereof. Upon further operation, the amount of air left in the body 50, and particularly above end 60 of line 58, decreases. This causes the flow of liquid through a circuitous route upwardly from line 42, downwardly along baffle 80, upwardly along baffle 80 and magnetic member 74, downwardly along the baffle 82 and magnetic member 74, and through the line 58, to improve the operational effectiveness of the magnetic member 74 and its ability to remove deleterious particles that may be in the liquid.

Reversing the direction of movement of the vehicle 10, and direction of rotation of the pump 40, will serve to evacuate the liquid in the pump 40 and the line 64 and positively seat or close the ball check valve 66 so that the liquid in the filter 70, etc., will not be withdrawn. While some liquid in reservoir body 50 may be expelled via the supply line 42, the reservoir body 50 arrangement generally limits the expelled amount to some intermediate, predetermined volume. Thus, while the pump 40 acts in reverse to suck some air in via the pump bearings and the like (not shown) and expels it out the line 42 via the passages 84, 86 above the magnetic member 74, there is still a positive supply of liquid remaining in the body 50, substantially at the level of the end 43 of the line 42, because of the differential elevational heights of the end 43 of line 42 and the end 60 of line 58.

Upon forward movement of the vehicle 10 again, the pump 40 will be substantially immediately provided with liquid from the body 50, even though the line 42 is in the initial filling process, thus positively avoiding loss of prime of the pump 40. It should be noted that the predetermined volume of liquid in the reservoir body 50 has an elevational level generally above the level of the line 58, insuring rapid pumping action of the lubrication system 38.

What is claimed is:

1. A lubrication system comprising:
    a supply of lubricating liquid;
    a first line having a first end in communication with the supply of lubricating liquid and extending upwardly therefrom to a second end;
    reservoir means comprising a reservoir body, the second end of the first line extending into the reservoir body for communication therewith;
    a second line having a first end extending into the reservoir body for communication therewith, the first end of the second line being at a lesser height than the second end of the first line, the second line having a second end extending outwardly of the reservoir body;
    a reversibly operated fluid pump connected to the second end of the second line and capable of pumping fluid through the second line to and from the reservoir body;
    whereby upon actuation of the pump to pump fluid from the reservoir body through the second line, lubricating liquid is drawn through the first line, into the reservoir body, through the second line and through the pump, to an area to be lubricated, and whereby, upon actuation of the pump to pump fluid to the reservoir body through the second line, lubricating liquid is pumped through the second line, into the reservoir body, up to the level of the second end of the first line, and through the first line, and air may be pumped through the second line into the reservoir body, and through the first line;
    the greater height of the second end of the first line as compared to the first end of the second line insuring that, when fluid is pumped through the second line into the reservoir body, the level of liquid in the reservoir body remains substantially at the level of the second end of the first line.

2. The lubrication system of claim 1 wherein the reservoir body is closed except for the second end of the first line entering therein, and the first end of the second line entering therein.

3. The lubrication system of claim 1 and further comprising a magnetic member fixed within the reservoir body and positioned so that at least some of the liquid lubricant therein flows adjacent the magnetic member.

4. The lubrication system of claim 1 wherein the height of the pump is substantially the same as the height of the second end of the first line.

5. The lubrication system of claim 3 wherein the magnetic member comprises a substantially flat magnetic member disposed between the second end of the first line and the first end of the second line.

6. The lubrication system of claim 5 and further comprising baffle means disposed within the reservoir body for directing at least some of the liquid lubricant flow therein adjacent the magnetic member.

7. A reservoir for use in a fluid system, said reservoir and fluid system comprising: a reservoir body comprising a top portion, a bottom portion, and side portions; a liquid supply; a first line having a first end communicating with the liquid supply and a second end extending into the reservoir body; a second line having a first end extending into the reservoir body and a second end extending outwardly therefrom; the reservoir body being closed except for the second end of the first line extending therein, and the first end of the second line extending therein; means for pumping fluid from the liquid supply through the first line, through the reservoir body, and through the second line; and a magnetic member fixed within the reservoir body and positioned so that at least some of the liquid from the liquid supply flowing through the reservoir body flows adjacent the magnetic member, wherein the first line extends upwardly from the liquid supply, and the second end of the first line is at a greater height than the first end of the second line, wherein the second end of the first line extends through the bottom portion of the reservoir body, and the first end of the second line extends through the bottom portion of the reservoir body, and wherein the magnetic member comprises a substantially flat magnetic member fixed relative to the bottom portion of the reservoir body and extending to adjacent the top portion of the reservoir body and disposed between the second end of the first line and the first end of the second line, along the second end of the first line, and further comprising first and second baffles extending downwardly from the top portion of the reservoir body to adjacent but spaced from the bottom portion of the reservoir body on either side of the magnetic member, the first baffle being disposed between the second end of the first line and the magnetic member, so that liquid from the liquid supply flows upwardly through the first line, downwardly along the first baffle, upwardly along the first baffle and magnetic member, downwardly along the second baffle and magnetic member, and through the second line.

8. The reservoir and fluid system of claim 7 and further comprising means for pumping fluid from the second line through the reservoir body and through the second line, and wherein the first and second baffles define first and second passages respectively adjacent the top portion of the reservoir body above the level of the second end of the first line.

* * * * *

UNITED STATES PATENT OFFICE
CERTIFICATE OF CORRECTION

PATENT NO. : 3,877,545
DATED : April 15, 1975
INVENTOR(S) : Robert S. Orr

It is certified that error appears in the above-identified patent and that said Letters Patent are hereby corrected as shown below:

On the Title Page, Item [73], change the spelling of the assignee's corporate name from "Caterpillar Tractor Company" to --- Caterpillar Tractor Co. ---.

Signed and Sealed this twenty-second Day of July 1975

[SEAL]

Attest:

RUTH C. MASON
Attesting Officer

C. MARSHALL DANN
Commissioner of Patents and Trademarks